United States Patent
Doering et al.

(10) Patent No.: US 7,613,850 B1
(45) Date of Patent: Nov. 3, 2009

(54) SYSTEM AND METHOD UTILIZING PROGRAMMABLE ORDERING RELATION FOR DIRECT MEMORY ACCESS

(75) Inventors: Andreas Christian Doering, Adliswil (CH); Patricia Maria Sagmeister, Adliswil (CH); Jonathan Bruno Rohrer, Zug (CH); Silvio Dragone, Adliswil (CH); Rolf Clauberg, Gattikon (CH); Florian Alexander Auernhammer, Adliswil (CH); Maria Gabrani, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/343,092

(22) Filed: Dec. 23, 2008

(51) Int. Cl.
 G06F 3/00 (2006.01)
(52) U.S. Cl. .............. 710/39; 710/36; 710/40; 710/41; 711/150; 711/151
(58) Field of Classification Search ........... None
 See application file for complete search history.

(56) References Cited

U.S. PATENT DOCUMENTS

| | | | |
|---|---|---|---|
| 5,263,142 | A | 11/1993 | Watkins et al. |
| 5,509,134 | A | 4/1996 | Fandrich et al. |
| 5,553,268 | A | 9/1996 | Willenz et al. |
| 5,778,446 | A | 7/1998 | Kim |
| 6,092,158 | A | 7/2000 | Harriman et al. |
| 6,286,083 | B1 | 9/2001 | Chin et al. |
| 6,295,588 | B1 | 9/2001 | Wilson |
| 6,574,682 | B1 | 6/2003 | Chan |
| 6,832,280 | B2 | 12/2004 | Malik et al. |
| 7,305,500 | B2 | 12/2007 | Adiletta et al. |
| 7,395,379 | B2 | 7/2008 | Glasco |
| 2004/0107306 | A1 * | 6/2004 | Barth et al. ........... 710/310 |
| 2007/0011364 | A1 | 1/2007 | Wezelenburg |
| 2008/0140971 | A1 | 6/2008 | Dankelal et al. |

FOREIGN PATENT DOCUMENTS

| | | |
|---|---|---|
| EP | 0 932 105 A2 | 1/1999 |
| GB | 2 337 141 A | 11/1999 |

(Continued)

OTHER PUBLICATIONS

McKee, Sally A., "Dynamic Access Ordering For Streamed Computations," IEEE Transactions on Computers, vol. 49, No. 11, Nov. 2000, pp. 1255-1271.

(Continued)

*Primary Examiner*—Eron J Sorrell
(74) *Attorney, Agent, or Firm*—Thorne & Halajian, LLP

(57) ABSTRACT

A computer system controls ordered memory operations according to a programmatically-configured ordering class protocol to enable parallel memory access while maintaining ordered read responses. The system includes a memory and/or cache memory including a memory/cache controller, an I/O device for communicating memory access requests from system data sources and a memory controller I/O Interface. Memory access requests from the system data sources provide a respective ordering class value. The memory controller I/O Interface processes each memory access request and ordering class value communicated from a data source through the I/O device in coordination with the ordering class protocol. Preferably, the I/O device includes at least one register for storing ordering class values associated with system data sources that implement memory access requests.

2 Claims, 2 Drawing Sheets

FOREIGN PATENT DOCUMENTS

| | | |
|---|---|---|
| JP | 2000/259494 | 3/1999 |
| JP | 2007/213225 | 8/2007 |

OTHER PUBLICATIONS

Hur, I., et al., "Adaptive History-Based Memory Schedulers," In Proc 37th Annual IEEE/ACM International Symposium on Microarchitecture; Portland, OR, Dec. 4-8, 2004; pp. 342-354.

McKee, Sally A., "Experimental Implementation of Dynamic Access Ordering" Technical Report; UMI order No. CS-93-42, Aug. 1, 1993; University of Virginia; pp. 1255-1271.

Li, Wentong, et al., "Feasibility of Decoupling Memory Management Form the Execution Pipeline," J. Syst. Archit., vol. 53, No. 12, Dec. 2007, pp. 927-936.

Catthoor, F "How to Solve the Current Memory Access . . . at the Compiler Level?," In Proc Conf on Design, Automation & Test; Paris, France, Mar. 27-30, 2000; pp. 426-435.

\* cited by examiner

SYSTEM AND METHOD UTILIZING PROGRAMMABLE ORDERING RELATION FOR DIRECT MEMORY ACCESS

FIELD OF THE INVENTION

The present invention broadly relates to computer system memory architectures, and more specifically relates to a memory controller I/O interface that implements ordered memory access according to a novel ordering class protocol allowing for increased parallel memory access.

BACKGROUND OF THE INVENTION

Modern Memory Systems, e.g. multi-channel Double Data Rate (DDR) memory, such as DDR/DDR1 or DDR2 memory architectures, have a significant performance advantage if several memory write accesses can be executed in an arbitrary order. The benefit of such an advantage is enhanced where the memory accesses also have to be handled by a cache coherency protocol. This protocol keeps the logic view of the memory content coherent in presence of caches. Before storing new data to memory for each cache line, the cache coherency protocol is checked to determine whether a recently changed version of the corresponding data is present in any cache. In this case, previously modified data is written to memory first. Therefore, the memory write operation can have a different duration for each cache line.

Memory write accesses that could be permitted to be carried out in arbitrary order would result in an average higher memory throughput. A complication arising from memory write accesses carried out in arbitrary order, however, is that any application program or electronic data system, that depends on data written by an IO device into memory, has to rely on the sequence in which data becomes visible to the application program or electronic data system. For example, using the Infiniband protocol, after reception of a data item (e.g., a write access) a "Completion Queue Element" is written to memory, the writing signaling to an application program, or to an electronic data system, the availability of newly written data.

Traditional Ethernet network interfaces are implemented using a buffer descriptor that is written after the received data frame is in memory, thereby signally the driver, or an executable application program that embodies the driver, that a write has occurred. The PCI-Express standard (where PCI stands for Peripheral Component Interconnect) defines (for a given operation) two modes to express ordering relationships. An access can be either ordered or it can be marked "relaxed ordered," with respect to other accesses with the same identifier. The ordering is applied within each Traffic Class (TC). Eight (8) different TCs are available for use in a system implementing PCI Express.

In known memory systems operating in accord with PCI-Express protocol, where an Input/Output (IO) device generates a high number of small requests, each resulting in two memory write operations (one for the payload data, another for the completion notification), the ordering scheme is slowed because the write completion notification must be written with the relaxed ordering switched off, i.e., in order mode. The ordering scheme is therefore sequentially dependent, with no parallelism.

SUMMARY OF THE INVENTION

The present invention overcomes shortcomings of known ordered memory system operation.

In one embodiment, the invention comprises a memory controller I/O interface that controls and implements ordered memory write access according to a novel ordering class protocol. The memory controller I/O Interface connects to a bus interconnect structure, a cache and/or main memory controller (memory/cache) and to computer system processors. The memory controller I/O Interface provides a more complex ordering relationship between individual memory write accesses received from an I/O device or other interconnect structure(s), allowing for more parallelism among several payload accesses while maintaining a well-ordered view I/O operations writing to memory and read responses of computer system processors to I/O device registers. The increased parallelism results in a higher throughput, and lower latency than is found in conventional computer memory operation.

To operate with the memory controller I/O Interface in accord with the novel ordering class protocol, each write access is provided with data associating the write access, or source of the memory write request with one of any number of ordering class qualifiers, or values. The memory controller I/O interface is configured to operate with any number of user defined, or programmatically defined ordering classes, provided for every memory write request. The ordering class data is associated with the source of the write access requests (data sources or modules).

For example, where the memory controller I/O interface and ordering class protocol is used in a computer system comprising a PCI-Express bus, several reserved bits in the same byte of the packet header that holds the TC are used to encode an ordering class value for a memory write, e.g., 5 bits, allowing for 32 ordering classes. In this case, code 0 always refers to the current PCI-Express ordering rules (i.e. without applying the additional options introduced in this invention), which guarantees backward compatibility.

The meaning of each ordering class is configured system-wide within each computer system in which the invention is applied. The novel class ordering protocol is rules driven. For each ordering class, rules are defined with respect to other ordering classes. The rules define which portion of the source identifier for a write data packet required to be taken into account to implement the novel ordering class protocol (independent of the destination-address), and system memory operation based thereon. While the suggested PCI-Express-based implementation preferably provides for 32 ordering classes, the invention may be configured with any number of ordering classes that may be supported by the I/O device. Hence, memory write access commands are executed according to class.

Ordering classes are defined at system and memory controller I/O interface configuration. For example, one ordering class (0xA) might be defined for work completions, while another ordering class (0xB) might be defined for payload transfers. A third class C might be defined for status, log messages, etc. For ordering class B (0xB), the ordering allows arbitrary reordering with other packets from the same class and all packets with different source identifiers. For the ordering class A (0xA), overtaking elements from ordering class B is not allowed, but overtaking other class A packets is allowed. Ordering class C has no ordering restrictions with respect to other classes, but requests from the same source in class C need to be ordered. This ensures that the latest information will be visible in memory.

In a preferred embodiment, the invention discloses a computer system for controlling ordered memory operations according to a programmatically-configured ordering class protocol to enable parallel memory access while maintaining ordered memory read responses.

The system includes a memory controller I/O Interface, a memory and/or cache memory including a memory/cache controller connected to the memory controller I/O Interface and an I/O device connected to the memory controller I/O Interface for communicating memory access requests from system data sources, where each memory access request is associated with a configured ordering class value. The memory controller I/O Interface processes each memory access request communicated through the I/O device in coordination with the ordering class protocol.

The memory controller I/O interface includes an incoming request buffer for storing incoming memory access requests from the I/O device in received order, where the memory access requests include an ordering class value. The I/O interface also includes a next request selector and ordering table with rules for implementing the ordering class protocol. The next request selector processes each stored memory access request based on its ordering class value, a rule from the table associated with the ordering class value and a listing of ordering dependencies for the stored memory access requests to control timing of communicating the memory access request to the connected memory.

Controlling the timing allows some memory access to be implemented out of order, according to ordering class, for improved memory operation. Preferably, the I/O device includes one or a set of registers for storing ordering class values provided by the system data sources with the memory access requests. And it is preferred that the ordering class values include an ordering class A for work completions, an ordering class B for payload transfers and an ordering class C for status and log messages, and wherein rules for ordering class A requests do not allow overtaking elements from ordering class B requests but allow overtaking other ordering class A requests, allow arbitrary reordering of ordering class B requests and do not restrict ordering class C requests with respect to other ordering classes but require that ordering class C requests from a same class C source must be ordered.

BRIEF DESCRIPTION OF THE DRAWINGS

A more particular description of the invention briefly described above is provided below by reference to specific embodiments thereof that are illustrated in the appended drawings, in which.

DETAILED DESCRIPTION OF THE INVENTION

The invention comprises a memory controller I/O interface that implements computer system memory control in accordance with the novel ordering class protocol, or rules. The memory controller I/O interface is arranged for connection to an I/O device, to cache/main memory controllers (i.e., cache/main memory) and to at least one processor within the computer system. An I/O-device, or a switch close to an I/O device, provides memory write requests to the memory controller I/O interface associated with an ordering class.

The memory controller I/O interface controls memory access in coordination with ordering class and in cooperation with termination protocol required by the system's main memory and cache. The memory controller I/O interface can also control access to a memory interface rather than direct memory or cache, or a system bus, and derivatives, without deviating from the scope and spirit of the invention. A GX-bus manufactured by International Business Machines Corporation, or IBM, is one such system bus.

Figure 1:
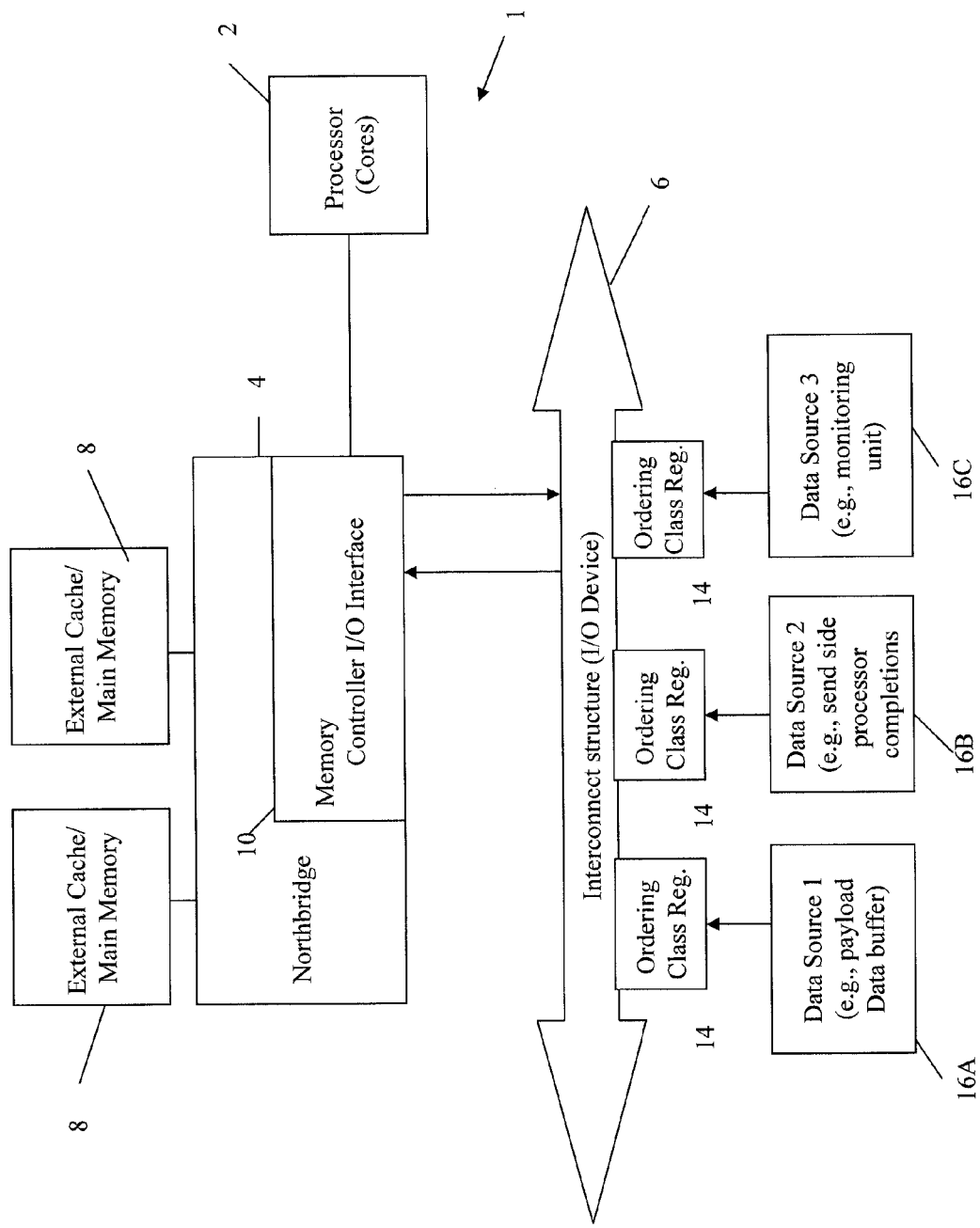
FIG. 1 is a schematic diagram depicting one embodiment of a computer system including memory controller I/O interface of the invention.

FIG. 1 depicts a computer system (1) that implements a programmable ordering relation to ordered memory access in accordance with the inventive principles. The computer system (1) includes processor cores (2) connected to a Northbridge (4). The Northbridge (4) is connected to an interconnect structure or I/O device (6), and to External Cache/Main Memory Units (8). The External Cache/Main Memory Units (8) may operate with memory/cache controller(s), as known to the skilled artisan.

The Northbridge (4) is shown to include a novel memory controller I/O Interface (10). The memory controller I/O Interface (10) implements an ordering class protocol when responding to I/O write access requests in order to introduce more parallelism and less latency in ordered system memory access. The I/O device (6) includes ordering class registers (14) and data sources (16A), (16B) and (16C). The reader should note that while only two External Cache/Main Memory unit (8) are shown in FIG. 1, any number external cache and main memory units may be controlled by the memory controller I/O interface, and that while only three data sources are shown connected to the I/O device (6), any number of data sources and associated ordering class registers can be supported by the novel memory controller I/O interface (10).

The I/O device (6) functions to multiplex the different data sources, and present the data as an I/O device bus interface to the Northbridge (4), i.e., memory controller I/O Interface (10). In many cases, these sources of data derive from different modules on the same chip. The I/O device (6) as used herein is intended to include an on-chip interconnection structure such as a bus, ring or crossbar. The bus might operate in accordance with any known protocol, such as Infiniband, Ethernet, PCI-Express (PCI-E).

For that matter, known bus I/O devices and other interconnect structure protocol may be extended in accordance with the invention to include operation with ordering class control data, or values and protocol of the invention. For example, the ordering registers (14) associated with each of data sources (16A), (16B) and (16C) are programmable registers for storing the ordering class value for each class of associated data source(s).

Each write access request received by the memory controller I/O Interface (10) includes an added ordering class value, which is generated and provided by the registers associated with each data source or module. This novel integration of the ordering class creation with the on-chip interconnect structure allows an easy redesign of existing chips comprising conventional IO devices because most modules can be reused unchanged. In an alternative system embodiment, every data source creates the ordering class in a programmable way.

The reader should note that the functionality usually associated with the term "Northbridge" is in many current computer systems may be part of one chip or integrated circuit that also comprises one or several processor cores (2) and one or more controllers comprising External Cache/Main Memory (8). In the memory controller I/O interface (12), the ordering class values are interpreted and utilized to provide a highly parallel access to the memory while still maintaining a well-ordered view of I/O operations for memory read responses of processors to values provided by an I/O device.

Figure 2:
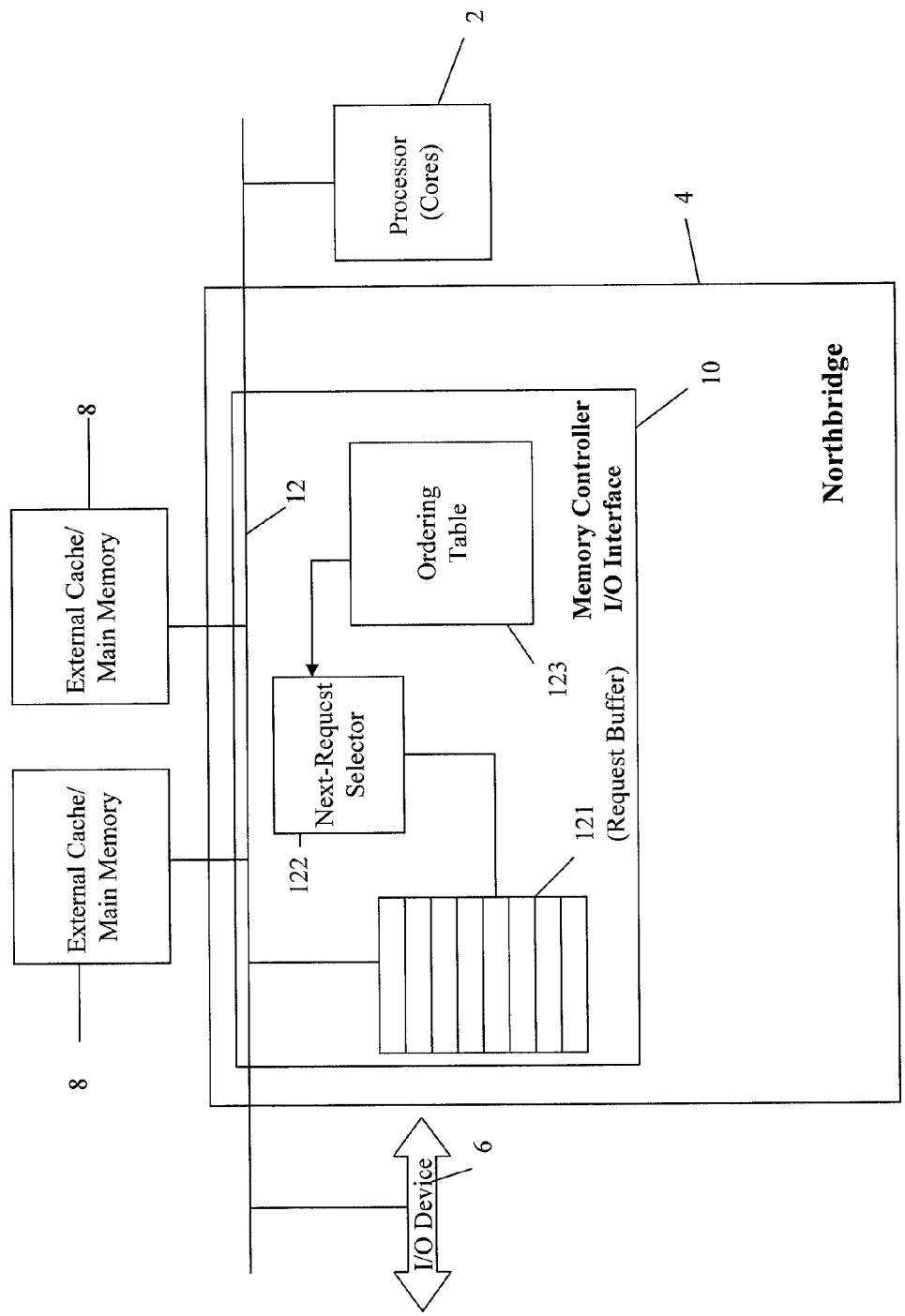
FIG. 2 is a schematic diagram of the FIG. 1 computer system highlighting the memory controller I/O interface.

FIG. 2 presents a more detailed view of memory controller I/O Interface (10), shown connected to the I/O device (6), External Cache/Main Memory (8) and processor Cores (2). The memory controller I/O Interface (10) includes a request buffer (121) with 8 buffer locations. The request buffer (121) is connected to a Next-Request Selector (122), and to a bus or system bus interface (12). The bus (12) connects to External Cache/Main Memory units (8), including any cache and memory controllers.

The External Cache/Main Memory may comprise multichannel DDR or DDR2 memory architectures. Operation of these conventional memory architectures with the memory controller I/O interface and ordering class protocol realizes a significant performance advantage in executing memory read and write accesses in an arbitrary order according to ordering class. The Next-Request Selector (122) is connected to an Ordering Table (123), from which the rules are applied. Incoming requests for read and write access to memory are stored in order in the request buffer (121).

New entries are investigated by the Next-Request selector (122). That is, the Next-Request Selector (122) checks the ordering class value from an incoming message and reads, from the ordering table, which ordering rules apply for the new request, and associated ordering class value. The Next-Request Selector maintains lists in Ordering Table (123), where the lists represent the ordering dependencies of all outstanding access requests pending in the Request Buffer (121), or currently being processed by the controllers associated with External Cache/Main Memory (8).

Typically, a new request is checked to determine whether a corresponding cache line is present in any cache (memory), and if not, depending on the request's address one or several specific memory controller(s) is/are selected to complete the read/write access. Depending on the previously determined dependencies, the corresponding request can be made visible to the controllers, or not.

The Request Buffer (121) cooperates with the External Cache/Main Memory through the memory controller I/O interface (10), enabling system memory performance optimization based on capability for parallel cache array accesses, and parallel memory bank access strategies, in accordance with the ordering class protocol. If the read/write request cannot be handed over to External Cache/Main Memory (i.e., controller), the request remains in the Request Buffer (121), and the Next Request Selector (122) updates its dependency lists according to the ordering class rules, or protocol.

If a cache controller completes a memory write request, it signals this to the next-request selector. The Next-Request Selector then removes dependencies, enabling outstanding requests in the Request Buffer (121), and forwards these requests to the corresponding External Cache/Main Memory that are then eligible for processing.

The ordering Table (123) comprises a small memory that is programmed to operate with the ordering class protocol systems requirements. Depending on the number of memory and cache controllers operating with the novel memory controller I/O interface, an expected cache hit rate, expected traffic distribution among system I/O devices and drivers, and different table configurations can be programmed. The configuration of the Ordering Table should be consistent with the settings or configuration of the Ordering Class Registers in the I/O devices or interconnect structure.

Several configurations in the Ordering Table are favorable for the same configuration in the I/O devices, dependent on the aforementioned characteristics. As shown, the ordering table has an entry for each ordering class. Each entry lists the set of ordering classes. The ordering classes are not allowed to be bypassed, in accordance with the ordering class rules, or protocol. Each ordering class can reflect other criteria, such as a node identifier or function identifier of the source of the request (originator data source or module), to qualify requesting classes.

The invention provides for encoding this ordering class information in various forms. For that matter, it is found in practice that a typical entry will have either many dependencies, or very few. Therefore, encoding sufficient to cover cases where a source has many dependencies or few dependencies is a preferred encoding. The entry can be encoded in two forms. In a first form, the entries comprise a list of classes for which a dependency exists and in a second form as all those classes where the dependency does not exist. Accordingly, a table entry (on average) will be reasonably small, e.g., a list of four elements and two bits per entry translates to 29 bits per entry for a PCI-E (typical), with 5 bits of ordering class field size. With 32 entries, the entire ordering table is still acceptably small, and manageable.

When the I/O device comprises an Ethernet adapter, the adapter receives a data frame and first stores the payload data before it writes the buffer descriptor. A typical Ethernet adapter maintains lists of buffer descriptors for both the send and the receive sides. This is a ring buffer containing fixed size entries, where each entry contains the start address, size and some status. Where the buffer is a send buffer, the size is filled by the driver software, and used by the I/O device. Where the buffer is a receive buffer, the size is filled by the I/O device, and utilized by the driver software.

For consistency with the drivers, any connected processor cores may only see the updates in External Cache/Main Memory, or buffer descriptor when all payload data is visible. Otherwise, if an I/O device driver would copy the payload data from the receive buffer and the received data was not yet completely written, stale data would be used. An ordering relationship, therefore, between the buffer descriptor and the payload data is required to operate in accordance with the novel ordering class protocol.

In a typical PCI-Express implementation, the payload stores would set the "relaxed ordering bit" to one, and for buffer descriptor stores it would be zero. Hence all buffer descriptor stores (with the same traffic class) are normally processed in strict sequential order. Such sequential operations can become a serious bottleneck in particular where there are many short messages to be written that require only one memory access for the payload data.

When operating in cooperation with the memory controller I/O interface (10), and ordering class protocol, the receiver buffer descriptor stores "would-be" assigned one traffic class, and the payload data stores assigned a second traffic class. A third traffic class would be assigned and used for send-side buffer descriptor stores. Further classes can be assigned for additional services, such as monitoring, tracing, etc. The receiver buffer descriptor class is ordered after receive side payload stores, but only for the same source system or application program identifier. Also, within an ordering class, the original source identification, or ID, must match to enforce sequential ordering. For that matter, send side and receive side buffer descriptor stores are maintained independently of each other.

Although examples of the present invention have been shown and described, it would be appreciated by those skilled in the art that changes may be made in these embodiments without departing from the principles and spirit of the invention, the scope of which is defined in the claims and their equivalents.

What is claimed is:

1. A computer system for controlling ordered memory operations according to a programmatically-configured ordering class protocol to enable parallel memory access while maintaining ordered memory read responses, the system comprising:

- a memory and/or cache memory including a memory/cache controller;
- an I/O device for communicating memory access requests from system data sources, where each memory access request is associated with a configured ordering class value; wherein the I/O device comprises at least one register for storing ordering class values provided by the system data sources with the memory access requests; and
- a memory controller I/O interface for processing each memory access request communicated through the I/O device to the memory in coordination with the ordering class protocol, comprising:
- an incoming request buffer for storing incoming memory access requests from the I/O device in a received order, wherein the memory access requests include an ordering class value; and
- a next request selector and ordering table with rules for implementing the ordering class protocol, wherein the next request selector processes each stored memory access request based on its ordering class value, a rule from the table associated with said ordering class value and a listing of ordering dependencies for the stored memory access requests to control timing of communicating the memory access request to the connected memory.

2. The system as set forth in claim 1, wherein the ordering class values include an ordering class A for work completions, an ordering class B for payload transfers and an ordering class C for status and log messages, and wherein rules for ordering class A requests do not allow overtaking elements from ordering class B requests but allow overtaking other ordering class A requests, allow arbitrary reordering of ordering class B requests and do not restrict ordering class C requests with respect to other ordering classes but require that ordering class C requests from a same class C source must be ordered.

* * * * *